Oct. 8, 1957 W. S. EDSALL 2,809,254
COMPOSITE FUSIBLE PROTECTIVE DEVICE
Filed April 12, 1955 2 Sheets-Sheet 1
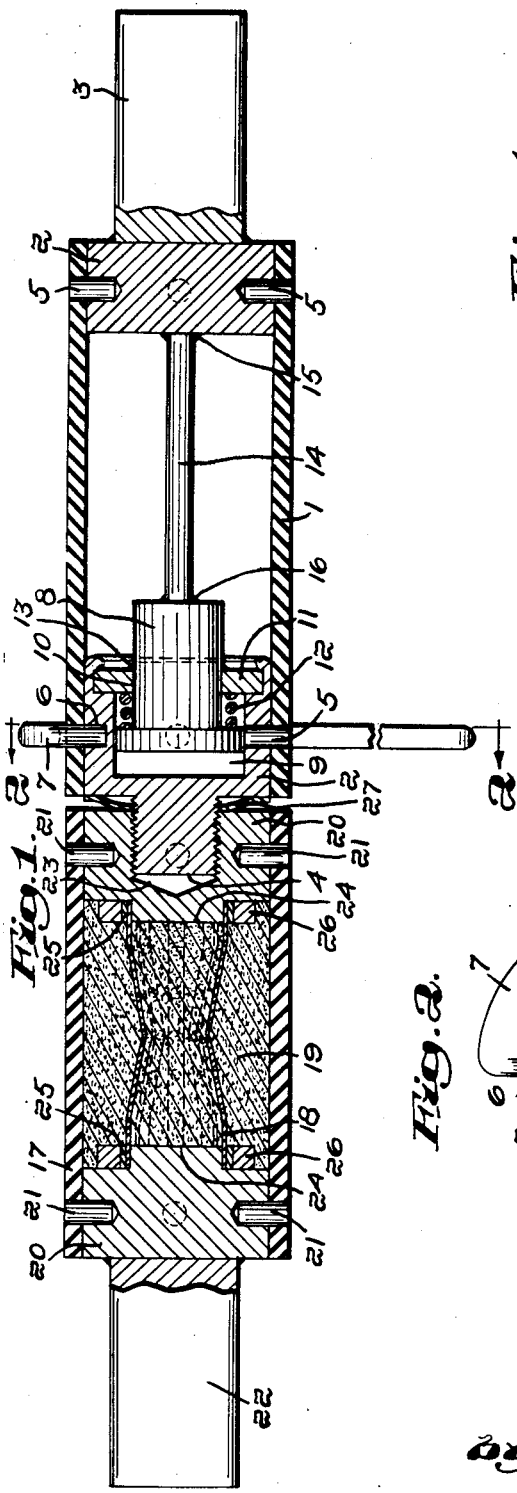
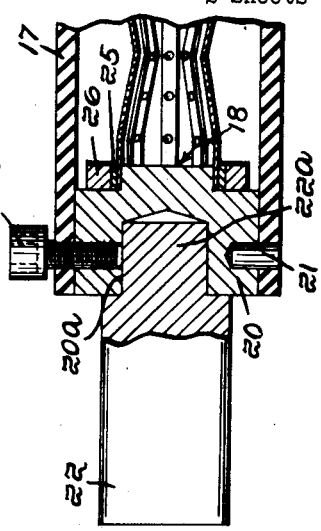
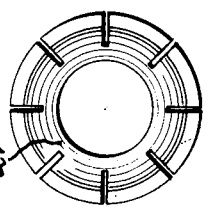
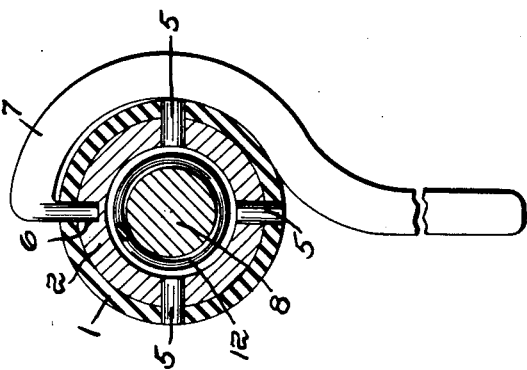
Inventor:
William S. Edsall,
by [signature] Attorney Oct. 8, 1957 W. S. EDSALL 2,809,254
COMPOSITE FUSIBLE PROTECTIVE DEVICE
Filed April 12, 1955 2 Sheets-Sheet 2
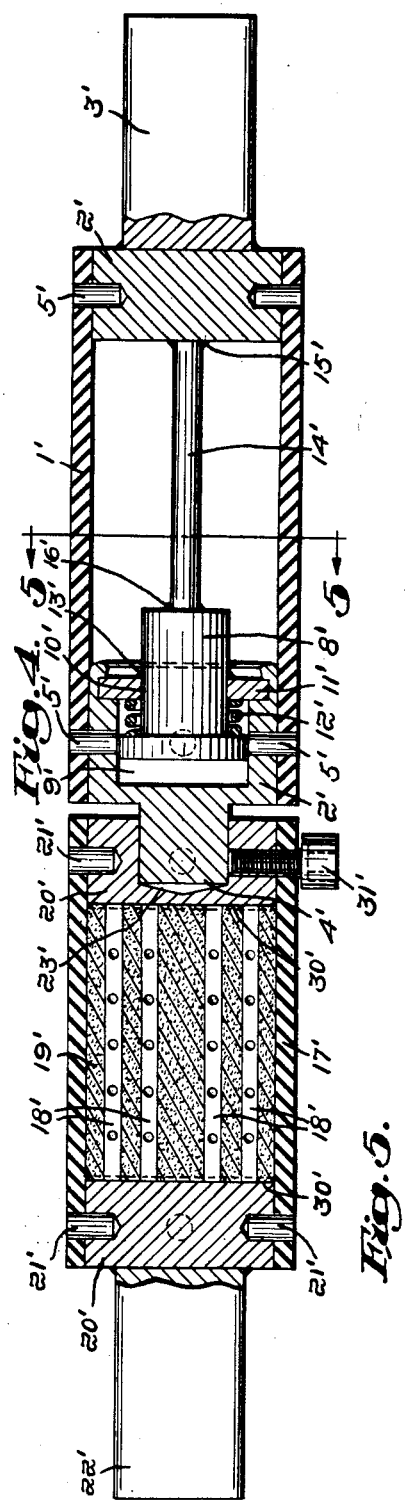
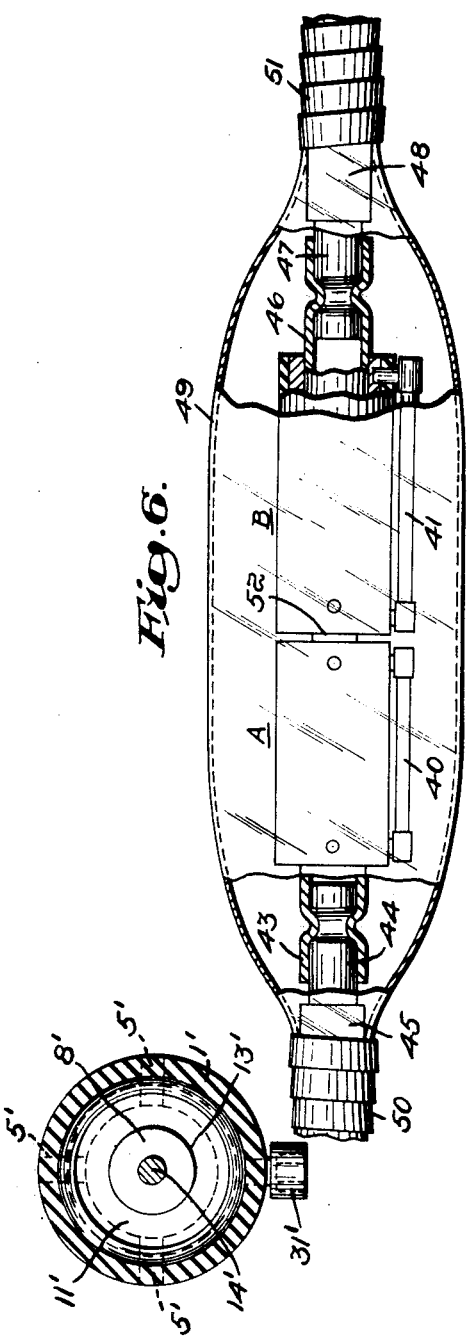
Inventor:
William S. Edsall,
by [signature]
Attorney United States Patent Office 2,809,254
Patented Oct. 8, 1957

2,809,254

COMPOSITE FUSIBLE PROTECTIVE DEVICE

William S. Edsall, Boston, Mass., assignor to The Chase-Shawmut Company, Newburyport, Mass.

Application April 12, 1955, Serial No. 500,920

11 Claims. (Cl. 200—114)

This invention relates to the protection of electric circuits against relatively small overloads of inadmissible duration and against major fault currents, and it is particularly concerned with the protection of electric circuits by combinations of fusible protective devices.

Since electric circuits require at least the two above referred to kinds of protection, it is generally necessary to apply combinations of two different kinds of protective devices, namely one for the protection against relatively small overloads of inadmissible duration and one for the protection against major fault currents. Protection against relatively small overloads of inadmissible duration calls for interrupting means having substantial time delay or time lag, and the ability of interrupting relatively small currents well. Preferred interrupting means of this nature are a pair of cooperating separable contacts conductively interconnected by a low fusing point, i. e. soft, solder joint and spring biased to the open position thereof. Appropriate heating means are generally associated with the aforementioned solder joint to cause softening thereof preparatory to separation of said pair of contacts and interruption of the overloaded circuit if and when the overload condition should last too long. Protection against major fault currents calls for interrupting means which have as little time delay as possible, i. e. which operate instantaneously upon inception of the fault current and which have the ability of interrupting relatively large currents well. Fuses comprising fuse links made of certain metals having certain geometrical configurations and comprising a suitable pulverulent arc-quenching filler are the answer to the problem of interrupting major fault currents.

The widely accepted so-called dual element fuses comprise one element for protection against relatively small overloads of inadmissible duration and another element for protection against major fault currents.

The tremendous increase of available short-circuit currents at various points of electric systems which occurred during recent years made it desirable to design the element in dual element fuses intended for protection against major fault currents in such a way as to achieve a substantial current-limiting action, i. e. to limit the peak of the let-through current through the fuse well below the peak of the available short-circuit current.

If a dual element fuse is to have a substantial current-limiting action, yet is not to exceed the size of a National Electric Code or NEC fuse having the same current and voltage rating, it becomes necessary to rigorously meet a number of requirements. The casing of such a dual element fuse ought to be made of a material having a very high bursting strength, the pulverulent arc-quenching filler ought to have a high degree of purity, the fuse link ought to be made of silver and ought to have one or more restricted cross-section portions or necks making it relatively fragile. As a result of these and other requirements the cost of manufacturing effective current-limiting dual element fuses are considerably higher than the cost of manufacturing conventional dual element fuses which are not current-limiting, or if current-limiting, only to a small degree.

The difficulties of the situation are further increased by virtue of the fact that the entire fuse must be replaced if only one of the two elements thereof responds to an overcurrent condition.

It is, therefore, one object of the present invention to provide composite structures made of two units and being in effect current-limiting dual element fuses, which structures are adapted to be so constructed as not to exceed in size a NEC cartridge fuse having the same current and voltage ratings, and which structures permit individual replacement of each of both constituent units thereof, thus making it unnecessary to replace the entire structure when only one of its constituent units, or elements, has become inoperative.

Another object of the invention is to provide composite structures which are in effect dual element current-limiting fuses adapted to be restored in the field for continued service when either one of its two elements responds to an overcurrent condition.

Still another object of the invention is to provide structures in the nature of dual element current-limiting fuses made up of two separate units or building blocks adapted to be put together and to be taken apart by service personnel in the field.

A further object of the invention is to provide composite dual element current-limiting fuses made up of such units or building blocks permitting for purposes of adjustment a relative rotation of the two units or building blocks about the common longitudinal axis thereof.

These and other objects of this invention will become apparent upon consideration of the following detailed description of preferred embodiments thereof, when taken in connection with the appended drawing, in which:

Fig. 1 is a longitudinal section of a dual element protective arrangement constructed in accordance with this invention;

Fig. 1a is a longitudinal section of a modified part of the structure shown in Fig. 1;

Fig. 2 is a section along 2—2 of Fig. 1;

Fig. 3 is a front elevation of a part of the structure shown in Figs. 1 and 2;

Fig. 4 is a longitudinal section of another dual element protective arrangement constructed in accordance with this invention;

Fig. 5 is a section along 5—5 of Fig. 4; and

Fig. 6 is in part a front view and in part a longitudinal section of a protective arrangement of the type shown either in Figs. 1 or 2 associated with a transparent protective sleeve.

Referring now to the patent drawing, and more particularly to Figs. 1 to 3 thereof, reference character 1 has been applied to indicate a substantially tubular casing of insulating material. A pair of terminal elements is arranged on the ends of casing 1. Each terminal element comprises a substantially cylindrical metallic plug body 2 on which casing 1 is mounted. The right plug body 2, as seen in Fig. 1, supports blade contact 3, whereas a screw-threaded projection 4 extends to the left of the left plug body 2. A plurality of transverse steel pins 5 attach casing 1 to plug bodies 2. The left plug body 2 is provided with a radial hole 6 for insertion of a spanner wrench 7. Plunger 8 is accommodated in a recess 9 provided in the left plug body 2. Plunger 8 comprises a portion having a relatively large diameter arranged within recess 9 and a portion having a relatively small diameter extending through an apperture or bore 10 in a cover 11 closing recess 9. The right edges of left plug body 2 are rolled around and overlap cover 11 to firmly maintain the same in position. Helical spring 12 arranged between cover 11 and the large diameter portion of plunger 8 biases the latter toward the left. Normally plunger 8 is held in position by a circular joint 13 of soft solder provided between plunger 8 and cover 11. Part 14 extending between the right plug body 2 and plunger 8 has two functions. It serves as a spacing post to maintain both plug bodies 2 properly spaced, and it serves also as a heater to simulate the heat generated in the conductors to be protected against overloads. To serve as a spacer part 14 must have a considerable amount of bending strength or dimensional stability. Part 14 is preferably a heater rod, i. e. a metal rod consisting of a metal combining the properties of relatively high bending strength and relatively high electric resistivity. Rod 14 may be provided with one or more points of reduced cross-section to increase the heating action thereof. The right end of heating rod 14 is secured to the right plug body 2 by a heat resistant joint 15 as, for instance, one produced by brazing. The left end of heating rod 14 is secured to the plunger 8 by a soft or low fusing point solder joint 16.

The second casing 17 houses current-limiting fuse means including a plurality of ribbon type fuse links 18 of silver and a filler 19 of quartz sand from which most, particularly metalic, impurities have been removed. Fuse links 18 form jointly a tubular fuse link, as more clearly shown in Fig. 1a wherein the pulverulent filler filling casing 17 has been omitted to better show the configuration of links 18. The diameter of the composite link made up of individual links 18 is smaller adjacent the center of casing 17 than at the ends thereof to limit heating of casing 17 by the hottest portions of links 18. Casing 17 consists preferably of a synthetic-resin-glass-cloth laminate having high bursting strength and being heat-shock resistant. Both ends of casing 17 are provided with terminal elements of which each includes a metallic plug body 20 attached to the casing 17 by a plurality of transverse steel pins 21. Left plug body 20 supports blade contact 22 which is identical with blade contact 3. Right plug body 20 is provided with an internally screw threaded recess 23 into which male member or projection 4 extends. Each plug body 20 forms a platform 24 at the axially inner side thereof and fuse links 18 are clamped against the lateral sides of platforms 24 by clamping means comprising an inner split ring 25 and an outer ring 26 which is not split. This method of securing ribbon-type fuse links to the terminal elements of fuses is described in detail in the copending patent application of Frederick J. Kozacka for Power Fuses With Tubular Links and Pressure Type Link Connections, filed June 14, 1954, Ser. No. 436,398, now United States Patent 2,777,033. A flexible cup spring or Belleville spring 27 is arranged between the juxtaposed surfaces of the right plug body 20 and the left plug body 2. Spring 27 rests with considerable pressure against right plug body 20 and left plug body 2 and thus provides a low resistance current path between the said two plug bodies.

Blade contacts 3 and 20 are intended for insertion of the dual element dual casing structure into a fuse holder or cut-out. Preparatory to insertion of the structure into a fuse holder or cut-out casings 1 and 17 must be turned relative to each other about their joint longitudinal axis until blade contacts 3 and 22 are situated in the same plane. This is achieved as shown in Fig. 2 by means of spanner wrench 17, whereupon the latter is removed from the composite fuse structure.

Insertion of the dual element dual casing structure into a fuse holder establishes the following current path: blade contact 3, right plug body 2, heater rod 14, soft solder joint 16, plunger 8, soft solder joint 13, cover 11, left plug body 2, cup-spring 27, right plug body 20, fuse links 18, left plug body 20, blade contact 22.

Upon occurrence of a protracted overload soft solder joints 16 and 13 fuse virtually simultaneously, permitting spring 12 to move plunger 8 toward the left, resulting in the formation of a circuit interrupting gap between heating rod 14 and plunger 8. Since only relatively low currents are interrupted at this gap, it is generally not necessary to associate any deionizing and cooling means with it, particularly if the circuit voltage is relatively low, say 250 volts. If the circuit voltage is relatively high, say in the order of 600 volts, or more, conventional de-ionizing and cooling means for the product of arcing formed at the gap between parts 14 and 8 should preferably be provided immediately adjacent to the gap. Upon interruption of the circuit by separation of contacts 14 and 8, the right casing 1 with all the parts pertaining to it may be replaced by a similar spare structure, yet all the means for protection against major faults may be retained, since they are unused and can readily be severed from the parts for overload protection.

On occurrence of major faults links 18 fuse and vaporize, but the low fusing point solder joints 13 and 16 are not affected by major fault currents on account of the relatively large thermal capacity of the parts which are associated with them and on account of the relatively high fusing energy of solder joints 13 and 16. Consequently, interruption and clearing of a major fault current by the composite structure shown in Figs. 1 and 2 calls merely for a renewal of the left or current-limiting unit thereof, and the right or overload protective unit can be retained.

If desired, cup washer 27 of the structure of Fig. 1 may be omitted and the left and the right device may be screwed together by spanner wrench 7 until their juxtaposed terminal elements or plug bodies 20 and 2 abut against each other under considerable pressure, thus establishing a good butt contact. When this position has been reached, blade contacts 22 and 3 generally will be angularly displaced and therefore cannot be inserted into a fuse holder or cut-out when, and as long as, so displaced. Fig. 1a shows a portion of the structure of Fig. 1 so modified as to enable to properly adjust blade contacts 22 and 2 when angularly displaced and no adjustments can be made by relative rotation of casings 1 and 17 about their common longitudinal axis. According to Fig. 1a the plug body 20 closing the left end of the casing 17 of the current-limiting fuse is provided with a coaxial cylindrical recess 20a into which a cylindrical projection 22a on blade contact 22 extends. Steel pins 21 of which but one is shown in Fig. 1a maintain plug body 20 in position relative to casing 17, and set screw 21a maintains blade contact 22 in position relative to plug body 20. If the two blade contacts 3 and 22 on the ends of a structure as shown in Fig. 1 are angularly displaced, blade contact 22 may be turned into the plane of the other blade contact upon untightening set screw 21a, which is re-tightened when blade contact 22 has been adjusted to be situated in the same plane as the blade contact on the opposite end of the composite structure.

The structure shown in Figs. 4 and 5 is substantially identical with the structure shown in Figs. 1 and 2 and will be described only to the extent that the former departs from the latter. In Figs. 4 and 5 the same reference numerals as in Figs. 1 and 2 with an added prime have been applied to indicate like parts.

According to Figs. 4 and 5 the casing 1' of the right device (as seen in Fig. 4) provided for overload protection is closed by two plug bodies 2'. Left plug body 2' has a projection 4' engaging a recess 23' in the right plug body 20' of the left device provided for protection against major fault currents. The two plug bodies 20' of the belt device are conductively interconnected by a plurality of multiperforated ribbon-type fuse links 18' of silver surrounded by a silicious arc-quenching filler 19'. The ends of fuse links 18' engage grooves 30' provided in the juxtaposed surfaces of plug bodies 20'. Solder joints (not shown) conductively connect links 18' and plug bodies 20'. Both plug bodies 20' are pinned to housing 19' by means of a plurality of transverse steel pins 21'. Screw 31' extends transversely across casing 19' and the right plug body 20' to firmly clamp projection 4' against the wall of recess 23'. This establishes a firm mechanical coupling or tie between both devices and enables transfer of current from one to the other without generating an undue amount of heat. Cooperating projection 4' and recess 23' assure also perfect alignment of both devices and permit relative rotation thereof to arrange both blade contacts 3' and 22' in a common plane.

Referring now to Fig. 6, reference letter A has been applied to generally indicate fusible short-circuit protective means of the same character as shown on the left side of Fig. 1, i. e. a current-limiting fuse. Reference letter B has been applied to generally indicate overload protective means of the same type as shown on the right of Fig. 1 or 4. The current-limiting fuse A is associated with an indicator 40 for visual indication of the condition the current-limiting fuse A is in. The overload protective device B is associated with an indicator 41 for indicating the condition the device B is in. Indicators 40 and 41 may be of any conventional design. If desired they may include a spring biased pin normally held in position by a spring restraining wire normally shunted by device A or B, respectively. When device A or B opens in response to an overcurrent the pin-restraining wire is caused to carry current, fuses rapidly and releases the pin which then indicates that the protective device has become operative. Such visual indicators are well known in the art, and therefore need not here be described in detail. A preferred form of a pin indicator has been disclosed in the copending patent application of Frederick J. Kozacka, Striker Pin Structures, filed November 15, 1954, Ser. No. 468,798, now United States Patent 2,794,095.

The left terminal element of the current-limiting fuse A comprises a piece of tubing 43 into which the bare end 44 of a cable 45 is inserted. Tubing 43 is indented by application of intense pressure to produce a good conductive connection between the bare core 44 of cable 45 and tubing 43. In a like fashion the right end of protective device B is provided with a terminal element including a piece of tubing 46 into which the bare end 47 of a cable 48 is inserted. Tubing 46 is indented in the same way as tubing 43. Reference numeral 49 has been applied to indicate a watertight protective sleeve or jacket made of a transparent elastomer. Sleeve or jacket 49 encloses the current-limiting fuse A, the indicator 40 of the current-limiting fuse A, the overload protective device B, the indicator 41 of the latter, and the axially outer terminal elements of devices A and B, including the tubular portions 43 and 46 thereof. Sleeve 49 has an axially inner portion of relatively wide cross-sectional area for receiving devices A and B and axially outer portions of relatively small cross-sectional area which fit fairly tightly or snugly upon cables 45 and 48, respectively. These portions of relatively small cross-sectional area are taped at 50 to cable 45 and at 51 to cable 48, thus producing a pair of moisture-proof joints. Sleeve 49 may more or less loosely surround devices A, 40, B and 41, or tightly fit upon them. If a tight fit is desired, sleeve 49 is preferably made of two molded parts which are joined together midway between the ends of the composite sleeve structure. Polyethylene is the preferred material of which sleeve 49 is made, polyethylene being so transparent as to readily enable checks of the condition protective devices A and B are in by viewing their respective indicating devices 40 and 41. Devices A and B are serially connected as indicated at 52 which may be achieved by the construction shown in Figs. 1 and 4, or a similar means.

Where it is desired to protect the insulation of a cable against excessive heat, heater 14 shown in Fig. 1 may be omitted, the heat required for fusing solder joints 13 and 16 then being supplied by the $I^2r$ losses in the cable rather than by an additional heater. It is apparent that omission of heater rod 14 enables to reduce substantially the size of the overload protective device. Where it is intended to use the dual element dual casing device for the protection of cables and to dispense with an additional heater, the masses of the device must be judiciously selected as more fully disclosed in United States Patent 2,546,690 to William S. Edsall et al. July 14, 1953, Thermal Protector for Conductor Insulation. As pointed out in this patent it may be desirable to exclude any heat source from the overload protective device for the cable except the cable itself. If the current-limiting fuse A has a much higher current rating than the overload protective device B, the heat generated in the current-limiting fuse may have little effect upon the operating characteristic of device B. Where it is desired to minimize the heating effect of device A upon device B their connection at 52 may be effected by a length of cable whereby their spacing may be considerably increased. Where devices A and B are arranged relatively far apart from each other each of both devices should preferably be provided with a separate transparent sleeve such as sleeve 49 shown in Fig. 6.

It will be understood that, although but a few embodiments have been shown and described in detail, the invention is not limited thereto. It will also be understood that the illustrated embodiments may be modified or other embodiments made without departing from the spirit or scope of the invention as set forth in the accompanying claims.

It is claimed:

1. A protective arrangement comprising a first substantially tubular casing of insulating material housing a pair of cooperating contacts conductively interconnected by low fusing point solder and spring biased to the open position thereof, a first pair of terminal elements secured to said first casing on opposite ends thereof, a second substantially tubular casing of insulating material housing current limiting fuse means, a second pair of terminal elements secured to said second casing on opposite ends thereof, one of said first pair of terminal elements and one of said second pair of terminal elements having cooperating male and female surfaces to establish a mechanical tie between said first casing and said second casing and cooperating contact means in the nature of a disconnect switch on said one of said first pair of terminal elements and on said one of said second pair of terminal elements serially connecting said pair of cooperating contacts and said current-limiting fuse means.

2. A protective arrangement comprising a first substantially tubular casing of insulating material housing a pair of cooperating contacts conductively interconnected by low fusing point solder and spring biased to the open position thereof, a first pair of terminal elements secured to said first casing on opposite ends thereof, a second substantially tubular casing of insulating material housing current-limiting fuse means, a second pair of terminal elements secured to said second casing on opposite ends thereof, one of said first pair of terminal elements and one of said second pair of terminal elements having cooperating male and female screw threads to establish a mechanical tie between said first casing and said second casing, and disconnect switch means providing a series connection between said pair of cooperating contacts and said current-limiting fuse means.

3. A protective arrangement comprising a first substantially tubular casing housing a pair of cooperating contacts conductively interconnected by low fusing point solder and spring biased to the open position thereof, a first pair of terminal elements comprising a first pair of plugs inserted into said first casing on opposite ends thereof, a second substantially tubular casing equal in diameter to the diameter of said first casing housing current-limiting fuse means, a second pair of terminal elements comprising a second pair of plugs inserted into said second casing on opposite ends thereof, one of said first pair of plugs being provided with a projection and one of said second pair of plugs being provided with a recess adapted to receive said projection to effect a coaxial alignment of said first casing and of said second casing, and means associated with said projection and said recess for establishing a mechanically firm electrically conductive connection between said one of said first pair of plugs and said one of said second pair of plugs.

4. A protective arrangement comprising a first substantially tubular casing of insulating material housing a pair of cooperating contacts conductively interconnected by low fusing point solder and spring biased to the open position thereof, a first pair of terminal elements secured to said first casing on opposite ends thereof, a second substantially tubular casing of insulating material housing current-limiting fuse means, a second pair of terminal elements secured to said second casing on opposite ends thereof, one of said first pair of terminal elements and one of said second pair of terminal elements each comprising a pair of blade contacts, and the other of said first pair of terminals and the other of said second pair of terminal elements comprising cooperating mechanical and electrical coupling means permitting relative rotation of said first housing and said second housing about the common longitudinal axis thereof.

5. A protective arrangement comprising a first substantially tubular casing of insulating material housing a pair of cooperating contacts conductively interconnected by low fusing point solder and spring biased to the open position thereof, a first pair of terminal elements comprising a first pair of plugs inserted into said first casing on opposite ends thereof, a second substantially tubular casing equal in diameter to the diameter of said first casing housing current-limiting fuse means, a second pair of terminal elements comprising a second pair of plugs inserted into said second casing on opposite ends thereof, one of said first pair of plugs and one of said second pair of plugs each comprising a pair of blade contacts, and the other of said first pair of plugs and the other of said second pair of plugs jointly defining a cooperating projection and recess aligning said first casing and said second casing and forming a cooperating pair of electrical connectors.

6. A protective arrangement comprising a first substantially tubular casing of insulating material housing a pair of cooperating relatively movable contacts conductively interconnected by low fusing point solder and a spring biasing said pair of contacts to the open position thereof, a first pair of terminal elements secured to said first casing on opposite ends thereof, a recess in one of said first pair of terminal elements accommodating one of said pair of contacts and said spring, a heat generating structure extending between the other of said first pair of terminal elements and said one of said pair of contacts and conductively connected by soft solder to said one of said pair of contacts, a second substantially tubular casing of insulating material housing current-limiting fuse means, a second pair of terminal elements secured to said second casing on opposite ends thereof, one of said first pair of terminal elements and one of said second pair of terminal elements jointly defining a cooperating projection and recess aligning said first casing and said second casing, and means associated with said one of said first pair of terminal elements and with said one of said second pair of terminal elements providing a series connection between said pair of cooperating contacts and said current-limiting fuse means.

7. A protective arrangement comprising a first substantially tubular casing of insulating material, a first pair of metal plugs each closing one end of said casing, a recess in one of said first pair of plugs, a cover covering said recess, a plunger extending through a hole in said cover, a first soft solder joint connecting said plunger to said cover, a spring within said recess biasing said plunger toward said recess, a heater extending between said plunger and the other of said first pair of plugs and having sufficient dimensional stability to operate as a spacing post between said plunger and said other of said first pair of plugs, a second soft solder joint connecting said heater to said plunger, a second substantially tubular casing of insulating material housing current-limiting fuse means, a second pair of metal plugs each closing one end of said second casing, one of said first pair of plugs and one of said second pair of plugs jointly defining a cooperating projection and recess aligning said first casing and said second casing, said one of said first pair of plugs and said one of said second pair of plugs also forming an electrical connector serially connecting said first solder joint and said second solder joint with said current-limiting fuse means.

8. A protective arrangement according to claim 7, wherein said heater is in the form of a relatively rigid heater rod.

9. A protective arrangement comprising a first substantially tubular casing housing a thermally responsive overload protective device including low fusing point solder means, a first pair of terminal elements secured to said first casing on opposite ends thereof, a first indicator for visual indication of the condition said overload protective device is in, a second substantially tubular casing housing current-limiting fuse means, a second pair of terminal elements secured to said second casing on opposite ends thereof, a second indicator for visual indication of the condition said current-limiting fuse means is in, one of said first pair of terminal elements and one of said second pair of terminal elements jointly forming a mechanical coupling between said first casing and said second casing and being adapted to provide a series connection between said overload protective device and said current-limiting fuse means, the other of said first pair of terminal elements and the other of said second pair of terminal elements each forming a connector adapted to receive one end of a cable, and a protective sleeve of a transparent elastomer having an axially inner portion of relatively wide cross-sectional area receiving said first casing, said first indicator, said second casing and said second indicator and axially outer portions of relatively small cross-sectional area adapted to engage cables associated with said arrangement.

10. A protective arrangement comprising a first substantially tubular casing of insulating material housing a pair of cooperating separable contacts conductively interconnected by low fusing point solder and a spring biasing said pair of contacts to the open position thereof, a first pair of terminal elements secured to said first casing on opposite ends thereof, a first indicator for visual indication of the condition said overload protective device is in, associated with said first casing, a second substantially tubular casing of a synthetic-resin-glass-cloth laminate housing current-limiting fuse means, a second pair of terminal elements secured to said second casing on opposite ends thereof, a second indicator for visual indication of the condition said current-limiting fuse means is in, associated with said second casing, one of said first pair of terminal elements and one of said second pair of terminal elements jointly defining a cooperating projection and recess aligning said first casing with said second casing, means associated with said one of said first pair of terminal elements and with said one of said second pair of terminal elements providing a series connection between said pair of cooperating contacts and said current-limiting fuse means, the other of said first pair of terminal elements and the other of said second pair of terminal elements each forming a connector adapted to receive one end of a cable, and a protective sleeve of polyethylene enclosing said first casing, said first indicator, said second casing, said second indicator, said other of said first pair of terminal elements and said other of said second pair of terminal elements.

11. A protective arrangement comprising a first terminal element adapted to close tubular casings, a second terminal element adapted to close tubular casings arranged in coaxial relation with respect to said first terminal element, a first tubular casing closed on one side thereof by said first terminal element and projecting from said first terminal element in a direction away from said second terminal, said first casing housing a thermally responsive overload protective device including a low fusing point solder means, a second tubular casing closed on one side thereof by said second terminal element and projecting from said second terminal element in a direction away from said first terminal element, said second casing housing current-limiting fuse means, means for serially connecting said overload protective device and said current-limiting fuse means including cooperating male and female surfaces on said pair of terminal elements, and releasable clamping means adapted to integrate said first casing and said second casing into a self-contained structural unit.

References Cited in the file of this patent

UNITED STATES PATENTS

| | | |
|---|---|---|
| 1,200,810 | Clemens | Oct. 10, 1916 |
| 1,251,983 | Lockwood | Jan. 1, 1918 |
| 1,276,567 | Price | Aug. 20, 1918 |
| 2,206,784 | Linton | July 2, 1940 |
| 2,609,465 | Goldsmith | Sept. 2, 1952 |
| 2,614,192 | Appleman | Oct. 14, 1952 |
| 2,645,690 | Edsall et al. | July 14, 1953 |